United States Patent
Barhold (12)

(10) Patent No.: US 10,494,259 B2
(45) Date of Patent: Dec. 3, 2019

(54) METHOD AND DEVICE FOR REGENERATION OF HYDROCHLORIC ACID

(71) Applicant: Andritz AG, Graz (AT)

(72) Inventor: Frank Barhold, Siegersdorf (AT)

(73) Assignee: Andritz AG, Graz (AT)

( * ) Notice: Subject to any disclaimer, the term of this patent is extended or adjusted under 35 U.S.C. 154(b) by 256 days.

(21) Appl. No.: 15/024,755

(22) PCT Filed: Sep. 15, 2014

(86) PCT No.: PCT/EP2014/002489
§ 371 (c)(1),
(2) Date: Mar. 24, 2016

(87) PCT Pub. No.: WO2015/043721
PCT Pub. Date: Apr. 2, 2015

(65) Prior Publication Data
US 2016/0244330 A1    Aug. 25, 2016

(30) Foreign Application Priority Data

Sep. 26, 2013 (AT) .................................. A 748/2013

(51) Int. Cl.
*C01B 7/07*     (2006.01)
*C23G 1/02*     (2006.01)
(Continued)

(52) U.S. Cl.
CPC ............. *C01B 7/0718* (2013.01); *B01J 10/00* (2013.01); *C01B 7/01* (2013.01); *C01B 7/07* (2013.01);
(Continued)

(58) Field of Classification Search
CPC ... B01J 10/00; C01B 7/01; C01B 7/07; C01B 7/0718; C01G 49/06; C01G 49/10; C23F 1/46; C23G 1/02; C23G 1/36
(Continued)

(56) References Cited

U.S. PATENT DOCUMENTS

| | | | | | |
|---|---|---|---|---|---|
| 3,399,964 | A | * | 9/1968 | Michels | C01G 49/06 423/488 |
| 3,529,931 | A | * | 9/1970 | Moklebust | C01G 49/10 423/150.3 |

(Continued)

FOREIGN PATENT DOCUMENTS

DE      19 32 765 A1    1/1970
WO      WO 93/10038 A1  5/1993

*Primary Examiner* — Jessee R Roe
*Assistant Examiner* — Michael Aboagye
(74) *Attorney, Agent, or Firm* — Alix, Yale & Ristas, LLP

(57) ABSTRACT

The subject matter of the present invention is a method to extract or recover hydrochloric acid from hydrochloric acid solutions containing metal by means of pyrohydrolytic treatment, followed by absorption and/or condensation of the gaseous hydrogen chloride thus formed in order to form hydrochloric acid. According to the invention, a first partial flow of the hydrochloric acid solution containing metal undergoes pyrohydrolytic treatment and a second partial flow of the metal-containing solution is fed to the absorption column. A device for implementing the process according to the invention is also the subject of the present invention.

10 Claims, 5 Drawing Sheets

(51) Int. Cl.
*C23G 1/36* (2006.01)
*B01J 10/00* (2006.01)
*C01G 49/10* (2006.01)
*C01B 7/01* (2006.01)
*C23F 1/46* (2006.01)
*C01G 49/06* (2006.01)

(52) U.S. Cl.
CPC ............ *C01G 49/06* (2013.01); *C01G 49/10* (2013.01); *C23F 1/46* (2013.01); *C23G 1/02* (2013.01); *C23G 1/36* (2013.01)

(58) Field of Classification Search
USPC ................ 266/114; 423/488, 484, 494.2
See application file for complete search history.

(56) References Cited

U.S. PATENT DOCUMENTS 5,980,850 A * 11/1999 Lebl .................. C23G 1/36
423/394.2
6,692,719 B1 * 2/2004 Wasmund ............ C01G 53/04
423/481

* cited by examiner

Fig. 1 – Prior Art

METHOD AND DEVICE FOR REGENERATION OF HYDROCHLORIC ACID

BACKGROUND

The subject matter of the present invention is a method to extract or recover hydrochloric acid from hydrochloric acid solutions containing metals by means of pyrohydrolytic treatment of the solution, followed by absorption and/or condensation of the gaseous hydrogen chloride thus formed in order to form hydrochloric acid. A device for implementing the process according to the invention is also the subject of the present invention.

Hydrochloric acid solutions containing metal are often encountered in the metal industry, for example, during pickling of carbon steel. These solutions contain free hydrochloric acids and metals dissolved as chlorides, such as iron. Hydrochloric acid solution containing approximately 18% HCl and as little iron as possible is typically added to the final pickle section in counter-current to the strip. The spent pickling solution containing approximately 120 g/l Fe from the first pickle section is removed and regenerated.

Several methods have already been developed by which the hydrochloric acid from the spent pickling solution can be recovered.

AT395312B describes a process where the acid is recovered by spray roasting of the solution containing metal, followed by absorption and/or condensation of the gases thus formed in an aqueous absorption solution. The metal oxides generated during pyrohydrolysis are removed at the base of the spray roaster.

EP 0775760 describes a similar process for recovery of acid by means of pyrohydrolytic treatment, where the waste pickling liquor undergoes pre-concentration by evaporation before pyrohydrolysis.

The set-up of these systems is known in specialist circles or from AT395312B and EP 0775760, thus it is not described in more detail here.

DE 19 32 765 discloses a method for regeneration of HCl from aqueous iron chloride solutions. Here, the iron chloride filtrate is divided into two partial flows. The first partial flow is roasted, and the second partial flow is fed to an absorber.

U.S. Pat. No. 3,399,964 A discloses a method to regenerate pickling liquor containing hydrochloric acid and iron. Here, a partial flow of the pickling acid is circulated in an absorption loop in order to increase the concentration of the pickling liquor, while the other partial flow is fed to a fluidized bed reactor after pre-concentration by evaporation.

The energy requirement for HCl regeneration in a conventional plant—depending on the size of the plant—is approximately 650-700 kcal per liter of waste pickling liquor fed to the plant. Normally, a gaseous fuel is used to fire the plant.

One disadvantage of the current HCl regeneration process by spray roasting is that the maximum possible metal concentration is not achieved in pre-concentration of the waste pickling liquor (Venturi loop), which means that an unnecessarily large amount of water is evaporated, causing a very high energy requirement for acid regeneration.

SUMMARY

The invention is thus based on the task of reducing the energy requirement for acid regeneration compared to conventional spray roasting systems.

This problem is solved by a novel method and apparatus to extract or recover hydrochloric acid from hydrochloric acid solutions containing metal.

According to the invention, the solution containing metal is split into a first and second partial flow. The first partial flow of the metal-containing, hydrochloric acid solution undergoes pyrohydrolytic treatment in a spray roasting reactor. However, the second partial flow of the metal-containing, hydrochloric acid solution does not undergo pyrohydrolytic treatment, but is fed to an absorption column. This leads to an increase in the metal content of the entire pickling/regeneration system.

Thus, only a partial flow of the metal-containing, hydrochloric acid solution is fed to the pyrohydrolytic treatment, and not the total quantity. As is evident from the exemplary embodiments herein, the free acid content is not changed and the pickling effect is not diminished as a result.

The fuel savings potential as a result of the invention is roughly 25%, and the power consumption is also lowered, in addition, because the waste gas volume is reduced to the same extent.

Moreover, the metal-containing, hydrochloric acid solution undergoes concentration by evaporation according to the invention, increasing the concentration of the solution. The concentration by evaporation may take place at various locations or stages, such as where all of the metal-containing, hydrocholoric acid solution is concentrated, or, for example, only involving the partial flow that is fed to the pyrohydrolytic treatment.

The gases from pyrohydrolytic treatment can be cooled by means of direct contact with the metal-containing, hydrochloric acid solution. This results in the metal-containing solution becoming more concentrated. Close to the maximum possible iron concentration can be achieved during the concentration process, thus less water must be evaporated.

In one embodiment, the first partial flow of more concentrated hydrochloric acid solution containing metal undergoes pyrohydrolytic treatment and the second partial flow of more concentrated hydrochloric acid solution containing metal is fed directly to the absorption column. The second partial flow can also, alternatively, be mixed beforehand with rinsing water.

In this embodiment of the invention, the regenerated acid has a higher trivalent iron content, which is known to enhance the pickling effect.

It is advantageous if the method according to the invention is used to regenerate the hydrochloric acid from a ferrous solution. It is useful here if a regenerated hydrochloric acid with an iron content of more then 10 g/l, preferably more than 40 g/l, is obtained after the absorption column.

In the pickle, the hydrochloric acid is thus not enriched from close to 0 g/l Fe to 120 g/l Fe, as was common in the past, for example, but from 40 g/l Fe, for example, to 160 g/l Fe, or from 50 g/l Fe to 170 g/l Fe.

The method according to the invention can be used either to regenerate the hydrochloric acid from a pickling process, or also from a leaching process.

An exemplary device for extraction and/or recovery of hydrochloric acid from solutions containing metal, comprises a feed line for the solution, a spray roasting reactor, and at least one absorption column into which the preferably cooled waste gas is fed.

According to the present disclosure, the feed line for the metal-containing solution leading to the spray roasting reactor has a branch piece so that only part of the metal-containinghydrochloric acid solution can be fed to the spray roasting reactor and another partial flow of the metal-containing hydrochloric acid solution can be fed to the absorption column. The hydrochloric acid solution containing metal is concentrated by evaporation before pyrohydrolysis.

The feed line for the second partial flow can either discharge directly into the absorption column or into the feed line for rinsing water.

In the following, an embodiment of the invention is described with reference to the drawings.

DETAILED DESCRIPTION

Figure 1:
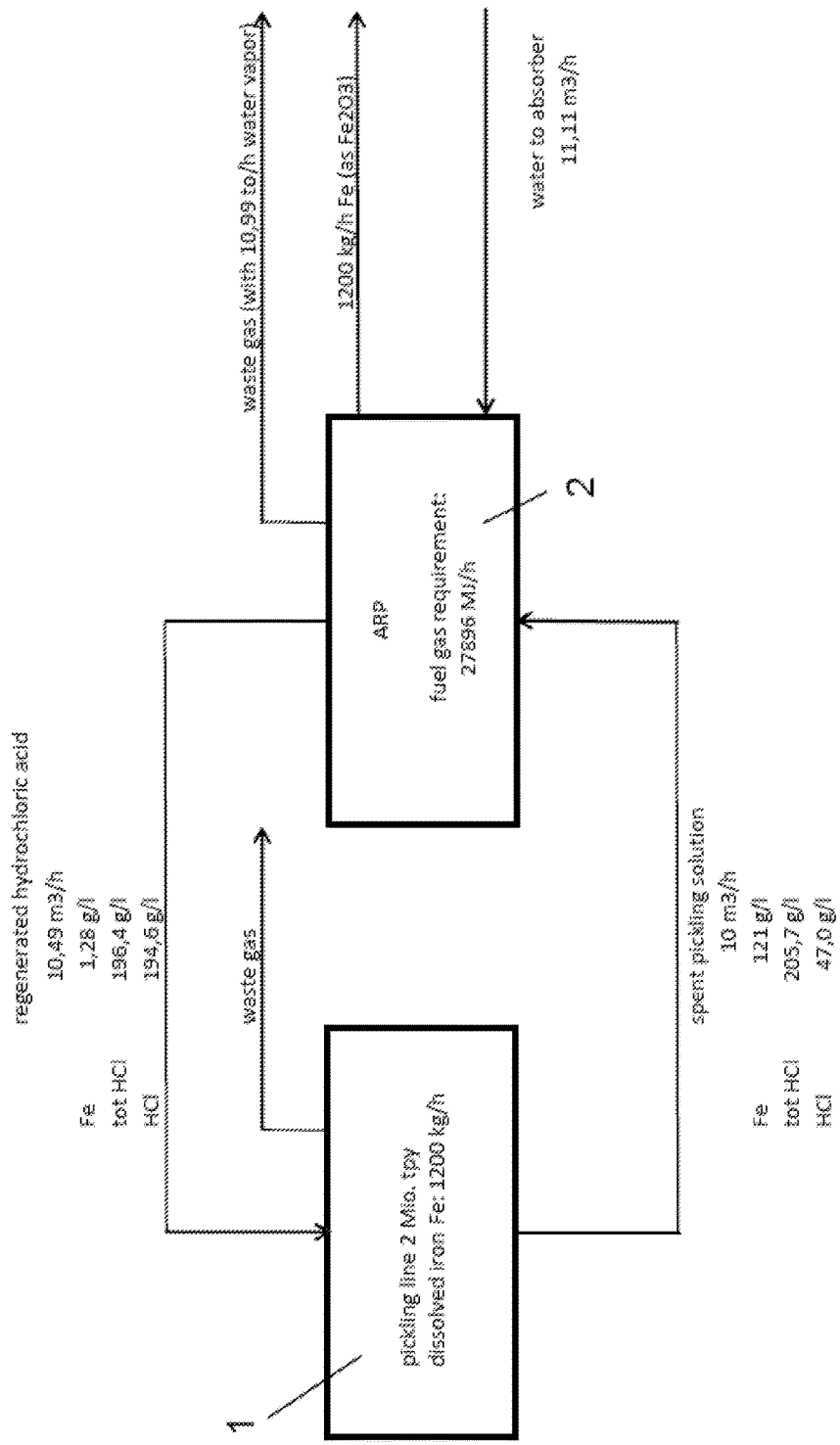
FIG. 1 shows a diagram of the mass flows in a conventional pickling line with acid recovery.

FIG. 1 shows a diagram of a pickling line 1 with an acid recovery plant 2 (ARP) according to the prior state of the art. In this pickling line, 1200 kg/h of iron are dissolved at a throughput of 2 million tonnes of low-alloy steel per annum, with a pickling loss of 0.4% (as Fe). Regenerated hydrochloric acid containing 194.6 g/l of free hydrochloric acid is pumped from the ARP (Acid Recovery Plant) 2 to the pickling line 1.

In pickling line 1, the hydrochloric acid reacts substantially according to the following reaction:

$$FeO + 2HCl = FeCl_2 + H_2O$$

and is thus spent and converted into iron chloride.

At an iron content of approximately 121 g/l and a free acid content of 47 g/l, the pickling solution is spent and fed to the acid recovery plant (ARP) 2. For such content, the required capacity of the ARP is 10 m³/h, and the fuel gas requirement is 27896 MJ/h. For absorption and/or condensation of the gases coming from the roasting reactor, 11.11 m³ of water per hour are fed to the absorption column in the acid recovery plant 2. In addition, 1200 kg of iron are discharged from the spray roasting reactor as $Fe_2O_3$.

Similarly, a waste gas flow of 10.99 tonnes of water vapor leaves the ARP hourly.

Figure 2:
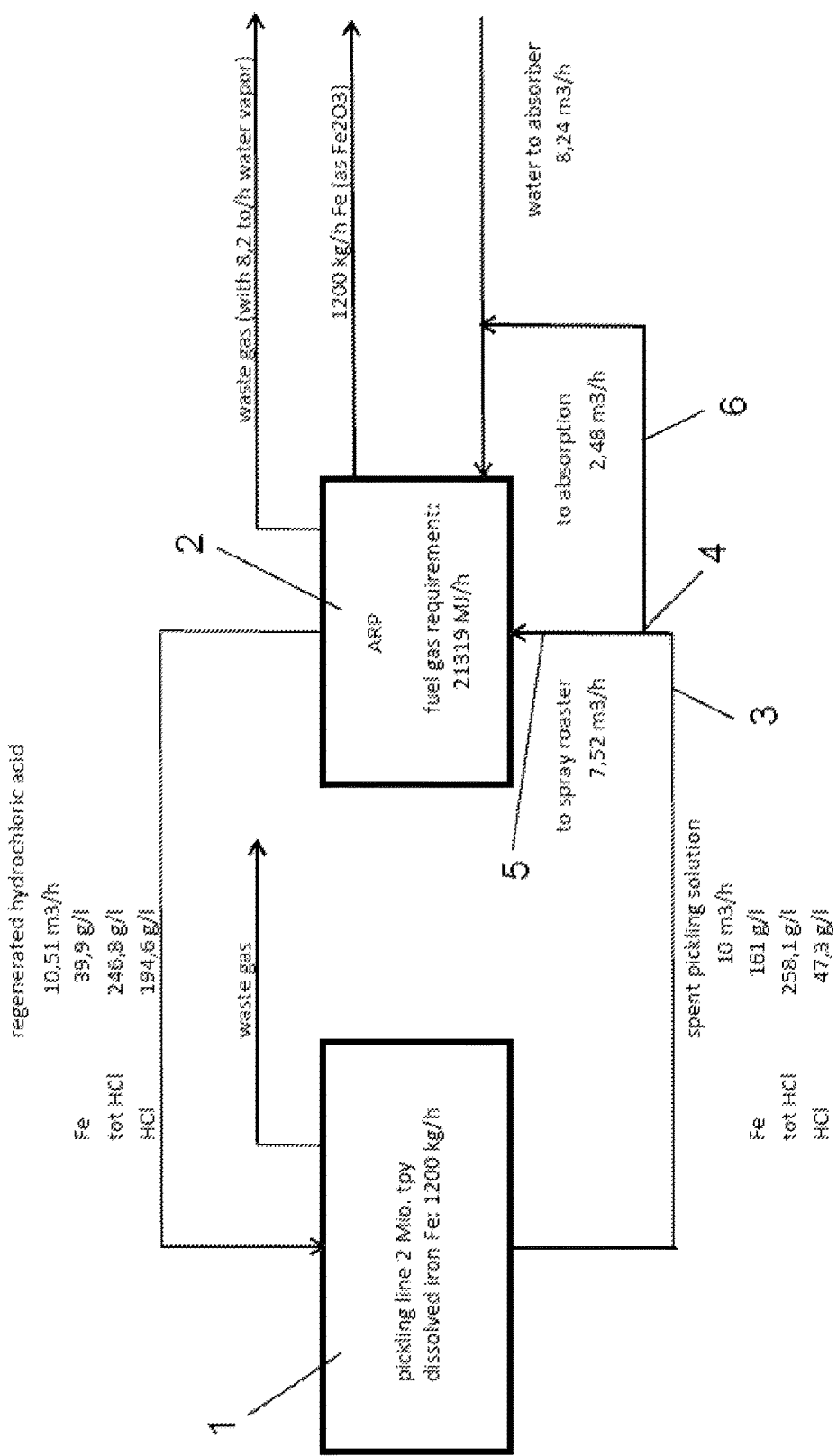
FIG. 2 shows a diagram of the mass flows in a pickling line with acid recovery according to an embodiment of the invention.
Figure 3A:
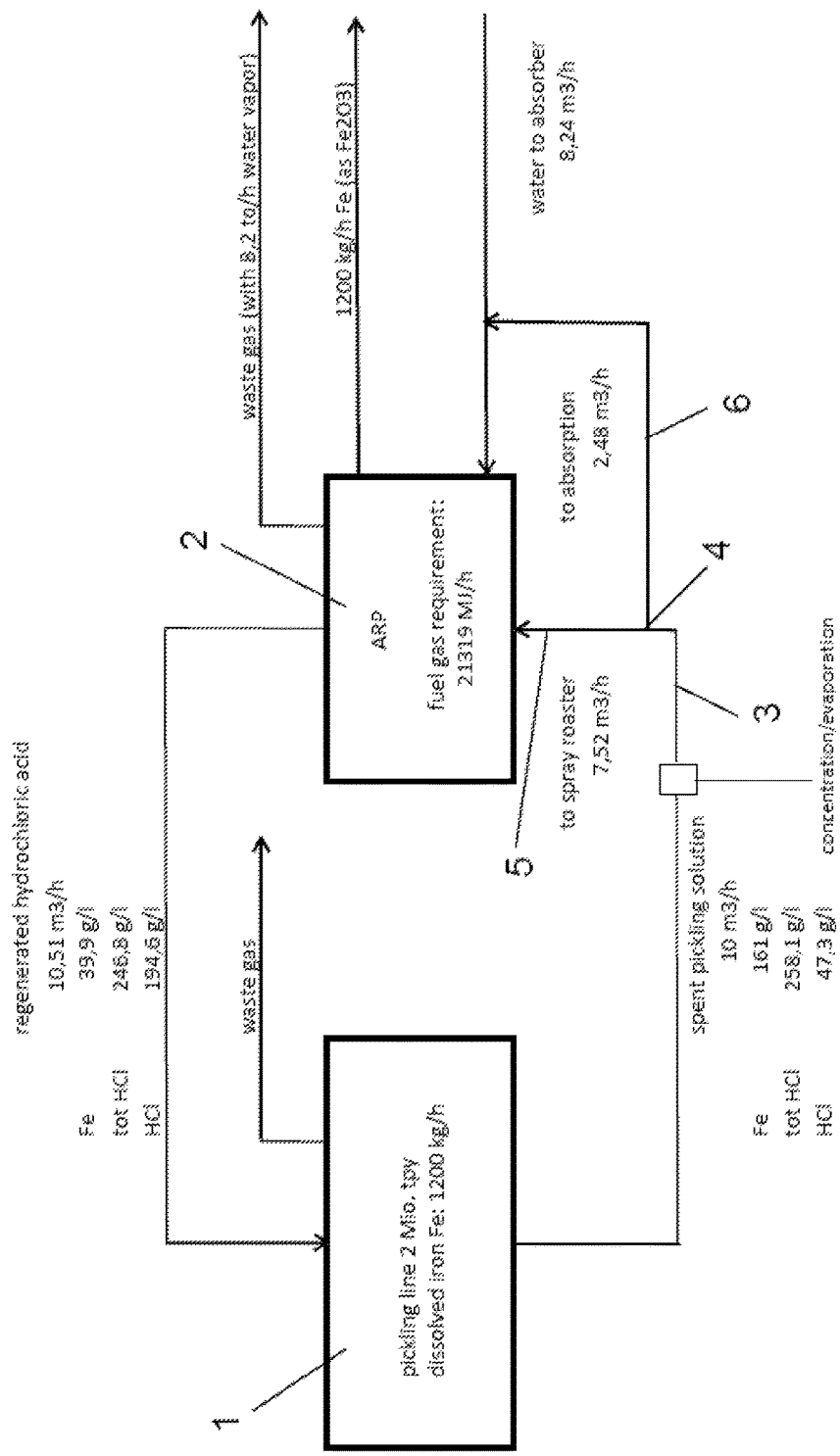
Figure 3B:
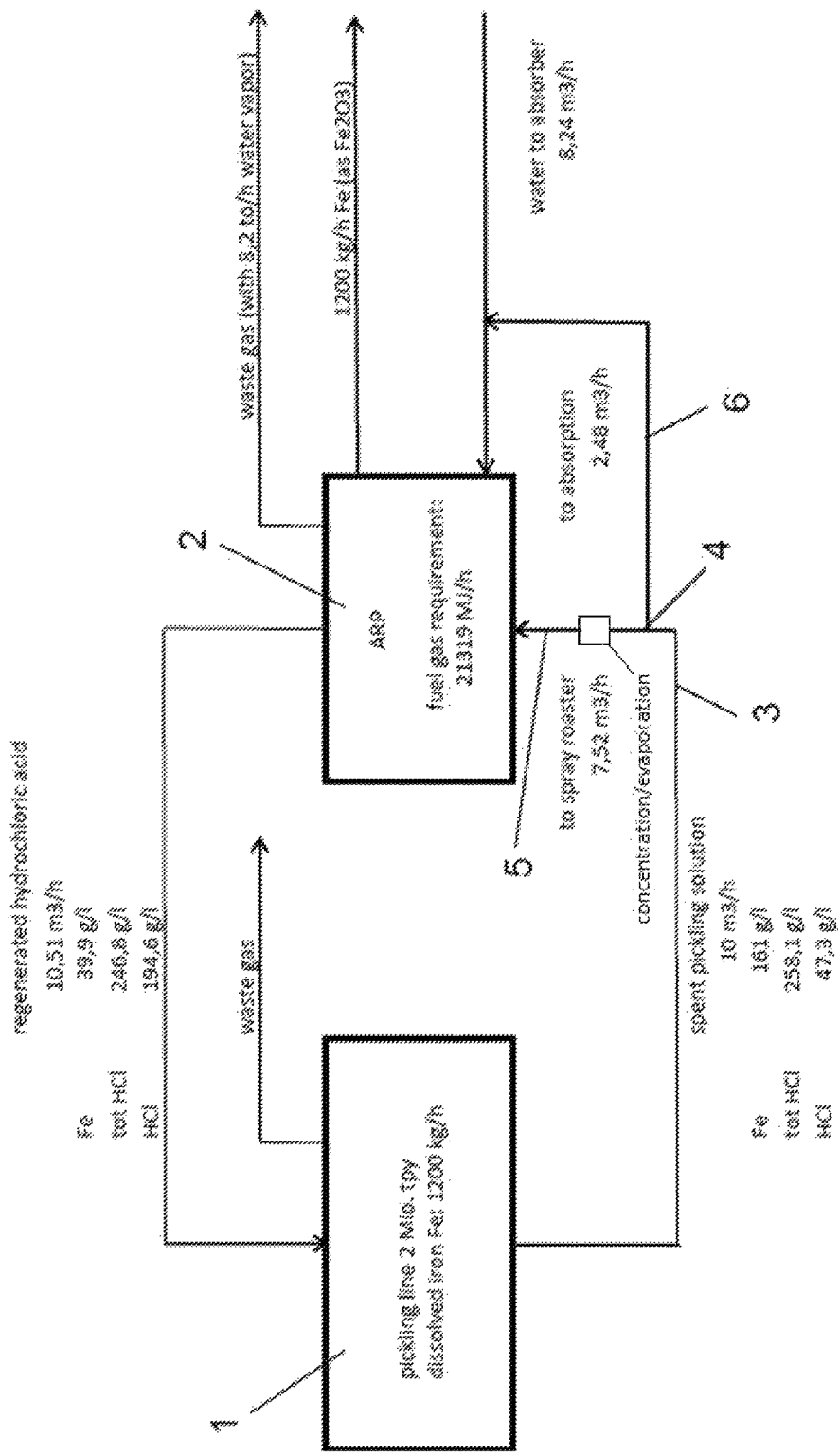
Figure 3C:
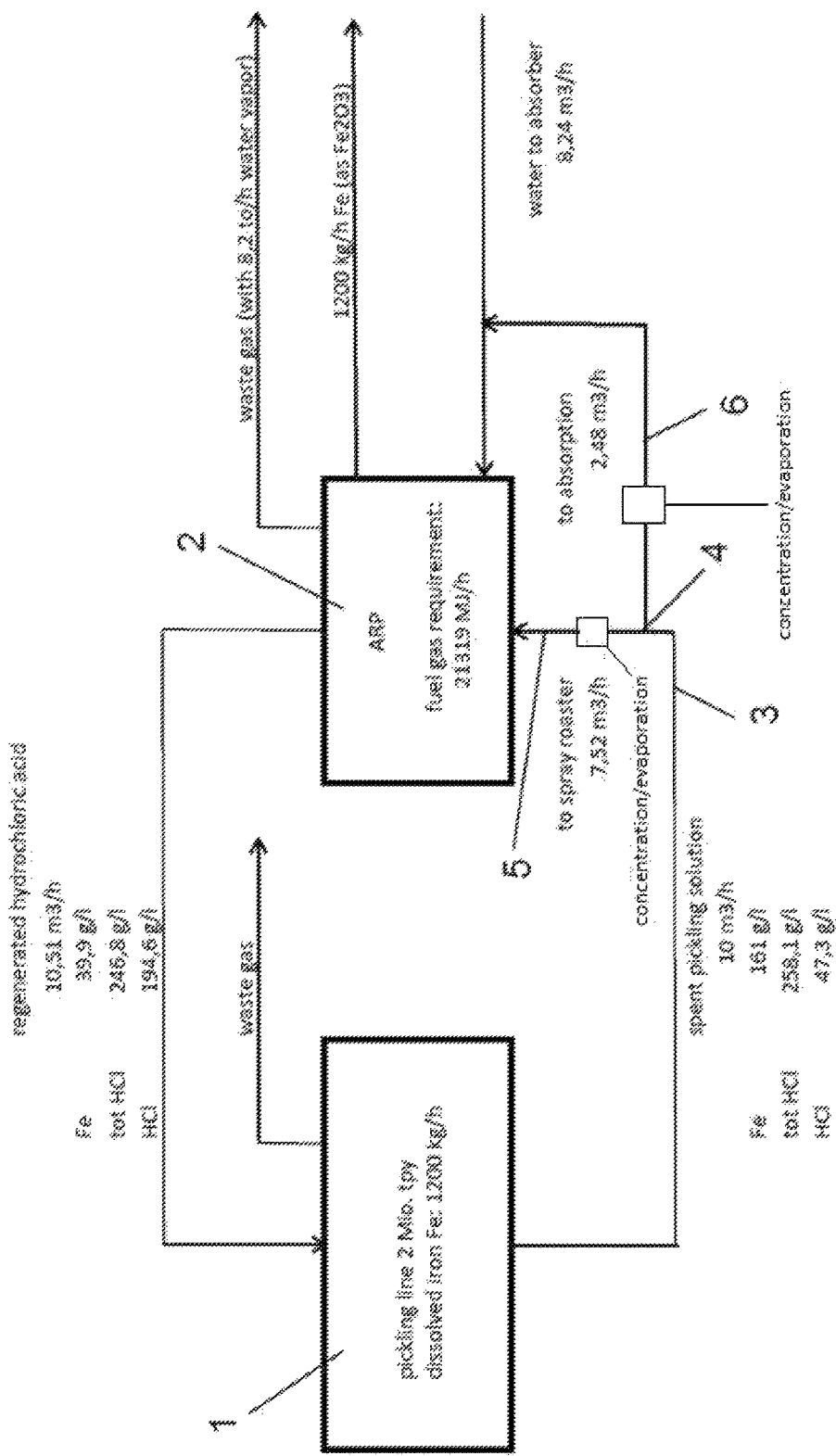

FIG. 2 shows a diagram of a pickling line 1 with an acid recovery plant 2 according to an embodiment of the invention. In this embodiment, regenerated hydrochloric acid containing 194.6 g/l of free hydrochloric acid is pumped from the ARP 2 to the pickling line 1. Due to the fact that a part 6 of the spent pickling solution is fed to the absorption column together with rinsing water, the regenerated acid has an iron content of 39.9 g/l. In the pickling line 1, the same amount of iron is dissolved as in FIG. 1, and the hydrochloric acid is spent.

At a free acid content of 47 g/l, the pickling solution is spent and fed through the feed line 3 to the acid recovery plant 2. In this scenario, the iron content is 161 g/l.

The feed line 3 to the ARP has a branch piece 4 through which a partial flow 5 of the spent pickling solution is fed to the pyrohydrolysis reactor (spray roaster), and another partial flow 6 of the spent pickling solution is fed to the rinsing water in the absorption column.

Thus, a smaller amount of spent pickling solution, compared to FIG. 1, is fed to the pyrohydrolysis in order to extract the same amount of iron (1200 kg/h). In this scenario, only 7.52 m³/h are fed to the pyrohydrolysis stage of the ARP, and the remaining 2.48 m³/h are fed to the absorption column, together with the water. Thus, the fuel gas requirement is only 21319 MJ/h.

As a result, 23.6% of the fuel gas is saved.

In addition, electrical energy is also saved, mainly due to the exhaust air fan, because the volume of process gas drops by the same proportion as the saved fuel gas. Thus, only 8.2 tonnes of water vapor per hour leave the ARP with the waste gas.

In both described embodiments of the present invention, both the regenerated and the spent acid each have approximately the same free HCl content. The process according to the invention does not have any negative influence on the pickling effect.

In another embodiment of the invention, the concentration of the spent acid is first increased in a cooling unit for the hot waste gases, e.g. in a Venturi loop. The concentrated, metal-containing solution (concentrate) is then split into a first and second partial flow. The first partial flow is fed to the pyrohydrolysis reactor and the second partial flow from the concentrated waste pickling liquor is fed to the absorber or to the rinsing water flowing to the absorber.

The results of some calculations are summarized in Table 1:

TABLE 1

|  |  | Fe (g/l) in waste picking liquor | Fe (g/l) in regenerated acid | Fe (g/l) in concentrate | Roaster feed quantity (m³/h) | Spec. energy consumption (kcal/l waste pickling liquor) | Fuel saving (%) |
| --- | --- | --- | --- | --- | --- | --- | --- |
| 1 | Conventional process (FIG. 1) | 120 | 0 | 202 | 6.64 | 666 | — |
| 2 | Waste pickling liquor to absorber | 160 | 40 | 270 | 4.99 | 509 | −23.6 |
| 3 | Waste pickling liquor to absorber | 170 | 50 | 284 | 4.68 | 479 | −28.0 |
| 4 | Concentrate to absorber | 160 | 40 | 237 | 5.65 | 570 | −14.4 |
| 5 | Concentrate to absorber | 170 | 50 | 245 | 5.45 | 550 | −17.4 |

The comparison in Table 1 shows that the energy-saving potential is greater if the waste pickling liquor is fed to the absorber, rather than its concentrate. The metal content in the regenerated acid is controlled via the amount of metal-containing solution mixed into the rinsing water for feeding to the absorber. Rinsing water consumption diminishes accordingly.

In an HCl regeneration for 5.3 m$^3$/h waste pickling liquor (for an annual pickling capacity of approximately 1 million tonnes), this results in savings of >200 k€/year, based on European energy prices.

The investment costs for a new plant are also lower.

Similarly, in existing plants, the invention can be used to achieve a significant increase in performance.

The invention claimed is:

1. Method to extract or recover hydrochloric acid from hydrochloric acid solutions containing metal by means of spray roasting followed by one or both of absorption and condensation of gaseous hydrogen chloride thus formed in order to form hydrochloric acid, comprising
    providing an initial flow of hydrochloric acid solution containing metal;
    splitting the flow of the hydrochloric acid solution containing metal into a first partial flow and a second partial flow of hydrochloric acid solution containing metal;
    feeding the first partial flow of hydrochloric acid solution containing metal to a spray roaster to undergo pyrohydrolytic treatment, which releases gases;
    directly contacting the gases released from the pyrohydrolytic treatment with the hydrochloric acid solution containing metal, thereby cooling the gases released from the pyrohydrolytic treatment and concentrating the hydrochloric acid solution containing metal;
    feeding the second partial flow of hydrochloric acid solution containing metal directly to an absorption column without undergoing pyrohydrolytic treatment, thereby increasing a concentration of metal in the hydrochloric acid solution containing metal, wherein
    at least one of the initial flow or the first partial flow of hydrochloric acid solution containing metal is concentrated by evaporation such that the first partial flow of hydrochloric acid solution containing metal fed to the spray roaster for pyrohydrolytic treatment is a concentrated solution.

2. Method according to claim 1, wherein the step of cooling gases released from the pyrohydrolytic treatment via direct contact with the hydrochloric acid solution containing metal causes a concentration of hydrochloric acid solution containing metal to increase via evaporation prior to splitting the hydrochloric acid solution containing metal such that the first partial flow to the spray roaster and second partial flow to the absorption column are both a concentrated solution.

3. Method according to claim 2, comprising mixing the second partial flow of hydrochloric acid solution containing metal with rinsing water before being fed to the absorption column.

4. Method according to claim 1, comprising extracting hydrochloric acid from a ferrous solution and using the extracted hydrochloric acid in the hydrochloric acid solution containing metal.

5. Method according to claim 4, comprising extracting a regenerated hydrochloric acid with an iron content of more than 10 g/l after the second partial flow of hydrochloric acid solution containing metal passes through the absorption column.

6. Method according to claim 1, wherein the hydrochloric acid solution containing metal originates from a pickling process, comprising regenerating hydrochloric acid by extraction after the second flow of hydrochloric acid solution containing metal passes through the absorption column and recycling the regenerated hydrochloric acid containing metal to the pickling process.

7. Method according to claim 1, wherein the hydrochloric acid solution containing metal originates from a leaching process, comprising regenerating hydrochloric acid by extraction after the second flow of hydrochloric acid solution containing metal passes through the absorption column and recycling the regenerated hydrochloric acid containing metal to the leaching process.

8. Method according to claim 1, wherein the first partial flow of the hydrochloric acid solution containing metal is concentrated by evaporation prior to feeding to the spray roaster.

9. Method according to claim 1, wherein both the first partial flow of the hydrochloric acid solution containing metal and the second partial flow of hydrochloric acid solution containing metal are a concentrated solution.

10. Method according to claim 9, wherein the initial flow of hydrochloric acid solution containing metal is concentrated by evaporation prior to splitting into the first partial flow and second partial flow.

* * * * *